United States Patent Office 3,557,014
Patented Jan. 19, 1971

3,557,014
FLUORESCENT CALCIUM AND STRONTIUM TITANATES
Malcolm D. Beals, Fanwood, and Leon Merker, Metuchen, N.J., assignors to National Lead Company, New York, N.Y., a corporation of New Jersey
No Drawing. Filed Mar. 20, 1968, Ser. No. 714,457
Int. Cl. C09k 1/60
U.S. Cl. 252—301.4       5 Claims

ABSTRACT OF THE DISCLOSURE

This invention describes a new and novel composition of matter which exhibits a red fluorescence when said material is exposed to ultra-violet light. The composition of matter comprises strontium titanate and/or calcium titanate and contains small quantities of particular rare earth oxides and particular Group III metal oxides. The rare earth oxides present may be praseodymium oxide, $Pr_2O_3$, and/or europium oxide, $Eu_2O_3$. The Group III metal oxide may be one or more of the following: aluminum oxide, $Al_2O_3$, gadolinium oxide, $Ga_2O_3$, and scandium oxide, $Sc_2O_3$. The composition may be prepared either as compacted or powdered multicrystalline material or as a massive monocrystalline body.

BACKGROUND OF THE INVENTION

Substantially pure strontium titanate and calcium titanate single crystals have been produced by the prior art, e.g. in U.S. Pat. No. 2,628,156 and U.S. Pat. No. 2,985,-520 respectively. In addition it previously has been described that the color of the single crystals may become substantially water-white if small quantities of $Al_2O_3$ are added to the boule feed material (see e.g. U.S. Pat. No. 2,685,525). None of the prior art strontium titanate or calcium titanate products exhibit any fluoresence when exposed to ultra-violet light.

SUMMARY OF THE INVENTION

According to the instant invention the following composition of matter possesses a red fluorescence when exposed to ultra-violet light.

Strontium titanate and/or calcium titanate containing one or both of the rare earth oxides selected from the group consising of $Pr_2O_3$ and $Eu_2O_3$ and one or more of the Group III metal oxides selected from the group consisting of $Al_2O_3$, $Ga_2O_3$ and $Sc_2O_3$, said rare earth oxide being present in amount from 0.1% to 7.0% preferably from 0.2% to 1.5% when employed to produce powdered compositions and from 0.05% to 2.0% preferably from 0.1% to 1.0% when employed to produce single crystals, said Group III oxide being present in amount from 0.05% to 3.0% preferably from 0.1% to 0.7% when employed to produce powdered compositions and from 0.05% to 2.0%, preferably from 0.1% to 1.0% when employed to produce single crystals, the percentages being based on the weight of the strontium titanate or calcium titanate, the powdered mixtures being heated to a temperature from at least 1000° C. to 1600° C. until the ingredients in the mixture begin to interact to form said composition.

The sintered compositions may be ground into powdered material and used as fluorescent coatings in paints, glass compositions or compacted masses. The single crystals may be sliced into plates to produce fluorescent surfaces.

DESCRIPTION OF PREFERRED EMBODIMENT

The strontium titanate and/or the calcium titanate powdered material used in the instant invention is substantially free from objectionable or incompatible impurities which detrimentally would effect the final product. The starting material should be finely divided and fairly uniform in size. Such a material may be formed by many means, such as reacting at elevated temperature $TiO_2$ and SrO or CaO, or by reacting reagent grade titanium oxalate with strontium chloride or calcium chloride to form strontium titanium oxalate or calcium titanium oxalate. After thoroughly washing, the strontium or calcium titanium oxalate is then heated to at least 500° C. to remove the oxalate values and to produce the strontium or calcium titanate of high purity. This particular procedure is described in more detail in U.S. Pat. No. 2,628,-156.

As stated previously, the composition of the instant invention may be prepared in compacted or powdered multicrystalline form or as massive single crystals. In preparing the composition in multicrystalline form the following procedure may be used:

The substantially pure strontium titanate and/or calcium titanate powdered starting material is thoroughly admixed with 0.1% to 7.0% of either or both $Pr_2O_3$ or $Eu_2O_3$ and with 0.05% to 3.0% of one or more of the following: $Al_2O_3$, $Ga_2O_3$ and $Sc_2O_3$. If desired the powdered mixture may be formed into compressed compacts, such as pellets and the like. This mixture either in powdered or compressed form is then heated to a temperature from 1000° C. to 1600° C. to sinter the mixture and to form a solid solution of the mixture. After the composition has been formed, the sintered mass may then be ground if desired. This powdered or compressed composition when exposed to ultra-violet light possesses a bright red color.

Massive single crystals of strontium titanate or calcium titanate are prepared as follows:

The strontium titanate or calcium titanate powdered starting material is admixed with from 0.05% to 2.0% of one or more of the rare earth oxides and from 0.05% to 2.0% of one or more of the Group III metals oxides as described above and the mixture is fed into an oxygen-hydrogen flame in order to melt the composition to form a single crystal boule. These boules were formed at temperatures between 2080° C. and 2150° C. Details of the method used to form the boules are described in U.S. Patent No. 2,628,156 and U.S. Patent No. 2,985,520.

After the boules have been formed and cooled, they are oxidized at 650° C. to 1700° C. to form a colorless single crystal. These massive single crystals possess strong fluorescence when subjected to ultra-violet light.

The following examples are presented to described in more detail the instant invention:

EXAMPLE 1

Preparation of powdered composition

Substantially pure powdered strontium titanate which was prepared by heating strontium titanium oxalate to drive off the oxalate values was used as the starting material. 100 grams of this finely divided strontium titanate were mixed thoroughly with 0.5 gram of powdered $Pr_2O_3$ and 0.2 gram of powdered $Al_2O_3$. The mixture was compressed into a pellet and was heated to 1400° C. for 24 hours to form a solid solution composition. After cooling the compressed composition was exposed to an ultra-violet light where it exhibited strong fluorescence.

EXAMPLES 2–7

The procedure of Example 1 was repeated except that varying amounts of $Pr_2O_3$ or $Eu_2O_3$ and $Al_2O_3$, $Ga_2O_3$ or $Sc_2O_3$ were substituted for those used in Example 1. In all cases the compositions formed possess red fluorescence in ultra-violet light. The details of operation and compositions employed are recorded in Table 1 along with those of Example 1.

Two control runs were made with strontium titanate in which only one of the necessary oxides were added, in one case only $Pr_2O_3$ was added while in the other only $Al_2O_3$ was added. In both of these cases the sintered mixture when exposed to ultra-violet light exhibited an unsatisfactory degree of fluorescence.

EXAMPLES 8–11

In these examples the procedure of Example 1 was repeated except that calcium titanate was used instead of strontium titanate. The calcium titanate used was prepared according to the process described in U.S. Patent No. 2,751,279. The sintered compositions of the instant examples contained varying amounts of rare earth oxides and Group III metal oxides.

The operational details and results obtained are recorded in Table 1.

EXAMPLES 12–16

In these examples, four massive monocrystalline boules of strontium titanate and one boule of calcium titanate were produced. Varying amounts of rare earth oxides and Group III oxides were employed in these examples.

These boules were prepared by passing the powdered mixture through an oxy-hydrogen flame onto a pedestal held within the oxidizing portion of the flame. The powdered mixture was melted and was crystallized onto the pedestal as the single crystal was produced. The boule when formed was dark in color but upon annealing the boule in an oxidizing atmosphere at 1400° C. followed by annealing at 400° C. it produced a colorless single crystal. A more detailed description is presented in U.S. Patent No. 2,628,156 and U.S. Patent No. 2,936,216.

All five of these boules possessed a strong red color when exposed to ultra-violet light.

The operational details and results of these examples are recorded in Table 2.

TABLE 1.—POWDERED COMPOSITIONS

| | 1 (strontium titanate) | 2 (strontium titanate) | 3 (strontium titanate) | 4 (strontium titanate) | 5 (strontium titanate) | 6 (strontium titanate) | 7 (strontium titanate) | 8 (calcium titanate) | 9 (calcium titanate) | 10 (calcium titanate) | 11 (calcium titanate) |
|---|---|---|---|---|---|---|---|---|---|---|---|
| Rare earth oxide used | $Pr_2O_3$ | $Pr_2O_3$ | $Eu_2O_3$ | $Eu_2O_3$ | $Pr_2O_3$ | $Pr_2O_3$ | $Pr_2O_3$ | $Pr_2O_3$ | $Eu_2O_3$ | $Pr_2O_3$ | $Pr_2O_3$ |
| Percent | 0.5 | 1.5 | 1.0 | 0.5 | 5.0 | 0.5 | 0.5 | 0.5 | 0.5 | 0.5 | 0.5 |
| Group III oxide used | $Al_2O_3$ | $Al_2O_3$ | $Al_2O_3$ | $Ga_2O_3$ | $Al_2O_3$ | $Sc_2O_3$ | $Ga_2O_3$ | $Al_2O_3$ | $Al_2O_3$ | $Ga_2O_3$ | $Sc_2O_3$ |
| Percent | 0.2 | 0.7 | 0.4 | 0.37 | 2.0 | 0.27 | 0.37 | 0.2 | 0.2 | 0.37 | 0.27 |
| Temperature employed, °C | 1,400 | 1,400 | 1,400 | 1,400 | 1,400 | 1,400 | 1,400 | 1,400 | 1,400 | 1,400 | 1,400 |
| Time of heat treatment (hr.) | 24 | 24 | 24 | 24 | 24 | 24 | 24 | 24 | 24 | 24 | 24 |
| Fluorescence in ultraviolet light | Strong | Strong | Satisfactory | Satisfactory | Satisfactory | Satisfactory | Strong | Strong | Satisfactory | Strong | Strong |

TABLE 2.—SINGLE CRYSTAL BOULES

| | Example No. | | | | |
|---|---|---|---|---|---|
| | 12 (strontium titanate) | 13 (strontium titanate) | 14 (strontium titanate) | 15 (strontium titanate) | 16 (calcium titanate) |
| Rare earth oxide used | $Pr_2O_3$ | $Eu_2O_3$ | $Pr_2O_3$ | $Pr_2O_3$ | $Pr_2O_3$. |
| Percent | 0.5 | 0.5 | 0.1 | 0.5 | 0.5. |
| Group III oxide used | $Al_2O_3$ | $Al_2O_3$ | $Ga_2O_3$ | $Sc_2O_3$ | $Al_2O_3$. |
| Percent | 0.21 | 0.21 | 0.08 | 0.28 | 0.21. |
| Temperature employed, °C | 1,400+400 | 1,400+400 | 1,400+400 | 1,400+400 | 1,400+400. |
| Time of heat treatment (hr.) | 12+12 | 12+12 | 12+12 | 12+12 | 12+12. |
| Fluorescence in ultraviolet light | Strong | Strong | Strong | Strong | Strong. |

While this invention has been described and illustrated by the examples shown, it is not intended to be strictly limited thereto and other variations and modifications may be employed within the scope of the following claims.

What is claimed is:

1. A composition of matter consisting essentially of an alkaline earth titanate selected from the group consisting of strontium titanate and calcium titanate and mixtures thereof, said titanate containing from 0.05% to 2.0% of rare earth oxide selected from the group consisting of $Pr_2O_3$ and $Eu_2O_3$ and mixtures thereof, said titanate also containing from 0.05% to 2.0% of Group III metal oxide consisting of $Al_2O_3$, $Ga_2O_3$, $Sc_2O_3$ and mixtures thereof.

2. A massive monocrystalline composition of matter consisting essentially of an alkaline earth titanate selected from the group consisting of strontium titanate and calcium titanate, said titanate containing from 0.05% to 2.0% of rare earth oxide selected from the group consisting of $Pr_2O_3$ and $Eu_2O_3$ and mixtures thereof, and containing from 0.05% to 2.0% of Group III metal oxide selected from the group consisting of $Al_2O_3$, $Ga_2O_3$ and $Sc_2O_3$, and mixtures thereof, the percentages being based on the weight of the alkaline earth titanate.

3. Composition according to claim 2 in which the rare earth oxide is present in amount from 0.1% to 1.0% and the Group III metal oxide is present in amount from 0.1% to 1.0%.

4. A composition of matter formed as a multicrystalline sintered material consisting essentially of an alkaline earth titanate selected from the group consisting of strontium titanate and calcium titanate and mixtures thereof, said titanate containing from 0.1% to 7.0% of rare earth oxide selected from the group consisting of $Pr_2O_3$ and $Eu_2O_3$ and mixtures thereof, and containing from 0.05% to 3.0% of Group III metal oxide selected from the group consisting of $Al_2O_3$, $Ga_2O_3$ and $Sc_2O_3$ and mixtures thereof, the percentages being based on the weight of the alkaline earth titanate.

5. Composition according to claim 4 in which the rare earth oxide is present in amount from 0.2% to 1.5% and the Group III metal oxide is present in amount from 0.1% to 0.7%.

References Cited

UNITED STATES PATENTS 2,685,525   8/1954   Merker _____ 106—42

OTHER REFERENCES

Weber et al., Vibronic Spectrum of $Eu^{+3}$ in Strontium Titanate, Physical Review, vol. 138, No. 5A, May 31, 1965, pp. A-1544–A-1551.

TOBIAS E. LEVOW, Primary Examiner

R. D. EDMONDS, Assistant Examiner